United States Patent
Lee et al.

(10) Patent No.: US 9,954,923 B2
(45) Date of Patent: Apr. 24, 2018

(54) METHOD FOR TRANSMITTING STREAM BETWEEN ELECTRONIC DEVICES AND ELECTRONIC DEVICE FOR THE METHOD THEREOF

(71) Applicant: Samsung Electronics Co., Ltd., Gyeonggi-do (KR)

(72) Inventors: Heung-Ki Lee, Gyeonggi-do (KR); Gil-Yoon Kim, Gyeonggi-do (KR); Soung-Kwan Kim, Gyeonggi-do (KR); Jong-Kyu Kim, Seoul (KR); Jong-Kyu Lim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/184,095

(22) Filed: Jun. 16, 2016

(65) Prior Publication Data

US 2016/0294912 A1 Oct. 6, 2016

Related U.S. Application Data

(63) Continuation of application No. 13/768,402, filed on Feb. 15, 2013, now Pat. No. 9,386,065.

(30) Foreign Application Priority Data

Feb. 24, 2012 (KR) .................. 10-2012-0018922

(51) Int. Cl.
  *H04N 11/02* (2006.01)
  *H04L 29/06* (2006.01)
  (Continued)

(52) U.S. Cl.
  CPC .......... *H04L 65/607* (2013.01); *H04L 65/601* (2013.01); *H04N 21/4122* (2013.01);
  (Continued)

(58) Field of Classification Search
  USPC .................................... 375/240.25
  See application file for complete search history.

(56) References Cited

U.S. PATENT DOCUMENTS 5,446,759 A * 8/1995 Campana, Jr. ........... H04B 7/10
  375/267
5,659,539 A * 8/1997 Porter .................. G11B 27/031
  348/E7.073
(Continued)

FOREIGN PATENT DOCUMENTS

CN  201222206 Y   4/2009
CN  101605252 A   12/2009
(Continued)

OTHER PUBLICATIONS

Chinese Notice of Allowance dated Jul. 5, 2016.
Korean Search Report; dated Feb. 20, 2018.

*Primary Examiner* — Leron Beck
(74) *Attorney, Agent, or Firm* — Cha & Reiter, LLC

(57) ABSTRACT

A technique for transmitting a video stream between a first electronic device and a second electronic device is provided. The first device receives an encoded video stream and determines whether an encoding format of the encoded video stream is a format decodable by a second electronic device. If the format is decodable, the encoded video stream is transmitted without a re-encoding operation to the second device. The video stream is displayed at the first device delayed by a determined delay time enabling the video stream to be displayed at the second device substantially synchronized with the display at the first device.

14 Claims, 10 Drawing Sheets

(51) Int. Cl.
*H04N 21/41* (2011.01)
*H04N 21/414* (2011.01)
*H04N 21/43* (2011.01)
*H04N 21/4363* (2011.01)
*H04N 21/4402* (2011.01)
*H04N 21/462* (2011.01)

(52) U.S. Cl.
CPC ... *H04N 21/4126* (2013.01); *H04N 21/41407* (2013.01); *H04N 21/4302* (2013.01); *H04N 21/43637* (2013.01); *H04N 21/440218* (2013.01); *H04N 21/4621* (2013.01)

(56) References Cited

U.S. PATENT DOCUMENTS

| | | | | |
|---|---|---|---|---|
| 5,717,415 A * | 2/1998 | Lue | H04N 13/0051 | 345/419 |
| 5,909,224 A * | 6/1999 | Fung | H04N 21/23406 | 345/531 |
| 6,014,545 A * | 1/2000 | Wu | H04H 60/96 | 348/E7.049 |
| 7,447,983 B2 * | 11/2008 | Conway | H03M 13/37 | 370/252 |
| 7,627,629 B1 * | 12/2009 | Wu | H04L 12/1818 | 348/14.09 |
| 7,864,814 B2 * | 1/2011 | Johansson | H04J 3/0632 | 370/508 |
| 8,229,000 B2 * | 7/2012 | Ito | H04N 21/233 | 375/240.12 |
| 8,253,860 B2 * | 8/2012 | Hsiao | G06F 3/1454 | 348/554 |
| 8,275,732 B2 * | 9/2012 | Candelore | H04N 21/4147 | 348/14.12 |
| 2002/0031188 A1 * | 3/2002 | Negishi | H04B 1/66 | 375/240.26 |
| 2004/0264929 A1 * | 12/2004 | Lee | H04N 21/4104 | 386/240 |
| 2005/0010960 A1 * | 1/2005 | Kitazawa | H04N 21/23655 | 725/117 |
| 2005/0105504 A1 * | 5/2005 | Sakoda | H04L 1/0002 | 370/349 |
| 2005/0169390 A1 * | 8/2005 | Veltman | H04N 19/42 | 375/259 |
| 2005/0180415 A1 * | 8/2005 | Cheung | H04L 1/0006 | 370/389 |
| 2006/0031889 A1 * | 2/2006 | Bennett | H04L 29/06027 | 725/80 |
| 2006/0143669 A1 * | 6/2006 | Cohen | H04N 7/173 | 725/90 |
| 2006/0161835 A1 * | 7/2006 | Panabaker | G11B 27/10 | 715/203 |
| 2008/0080596 A1 * | 4/2008 | Inoue | G06F 3/14 | 375/211 |
| 2009/0015723 A1 * | 1/2009 | Doumuki | H04N 5/775 | 348/725 |
| 2009/0141182 A1 | 6/2009 | Miyashita et al. | | |
| 2009/0183197 A1 * | 7/2009 | Matthews | H04N 21/23424 | 725/32 |
| 2009/0290638 A1 * | 11/2009 | Henry | H04N 21/242 | 375/240.12 |
| 2010/0061466 A1 * | 3/2010 | Gozen | G10L 19/167 | 375/240.28 |
| 2010/0068996 A1 * | 3/2010 | Haartsen | H04B 5/0025 | 455/41.1 |
| 2010/0272102 A1 * | 10/2010 | Kobayashi | H04N 21/4305 | 370/389 |
| 2010/0289871 A1 * | 11/2010 | Tatsuta | H04N 13/0059 | 348/42 |
| 2010/0302346 A1 | 12/2010 | Huang et al. | | |
| 2010/0303159 A1 | 12/2010 | Schultz et al. | | |
| 2010/0329360 A1 * | 12/2010 | Jung | G11B 27/10 | 375/240.28 |
| 2011/0157298 A1 | 6/2011 | Huang et al. | | |
| 2011/0302618 A1 | 12/2011 | Odlund et al. | | |
| 2012/0057031 A1 * | 3/2012 | Bush | H04N 5/04 | 348/194 |
| 2013/0058419 A1 * | 3/2013 | Ye | H04N 21/43637 | 375/240.25 |
| 2013/0182104 A1 * | 7/2013 | Mangold | H04N 21/21805 | 348/143 |

FOREIGN PATENT DOCUMENTS

| | | |
|---|---|---|
| CN | 101803390 A | 8/2010 |
| CN | 101807389 A | 8/2010 |
| CN | 102256128 A | 11/2011 |
| KR | 10-2010-0030663 A | 3/2010 |
| KR | 10-2011-0114200 A | 10/2011 |
| WO | 2009/038615 A1 | 3/2009 |
| WO | 2010/106075 A1 | 9/2010 |

* cited by examiner

US 9,954,923 B2

METHOD FOR TRANSMITTING STREAM BETWEEN ELECTRONIC DEVICES AND ELECTRONIC DEVICE FOR THE METHOD THEREOF

CROSS REFERENCE TO RELATED APPLICATIONS

This application is a Continuation of U.S. patent application Ser. No. 13/768,402 filed on Feb. 15, 2013 which claims the benefit under 35 U.S.C. § 119(a) to a Korean patent application filed in the Korean Intellectual Property Office on Feb. 24, 2012, and assigned Serial No. 10-2012-0018922, the entire disclosure of which is hereby incorporated by reference.

TECHNICAL FIELD

The present disclosure relates generally to a method and electronic device for transmitting a video stream, and more particularly, for transmitting a video stream between electronic devices that communicate with each other according to a short range communication scheme.

BACKGROUND

Communication techniques between electronic devices are advancing in various ways. In particular, with advances in communication technologies for portable terminals and introduction of Internet connectivity, communication between electronic devices including portable terminals is utilized for many purposes.

Wi-Fi communication is a Wireless Local Area Network (WLAN) technology. WLAN provides a communication service such as Internet to portable terminals (e.g., smart phones, tablet PCs, Personal Digital Assistants (PDAs), notebook computers, etc.) traveling within a certain distance from an installed Access Point (AP) which is a wireless access device. WLAN technology had a short propagation distance of about 10 m in the early stage but has recently greatly expanded the propagation distance up to 50 m~hundreds of meters. Data transfer rates in WLAN have also improved to transmit and receive high-volume multimedia data.

The advance of Wi-Fi communication has enabled the development of a Wi-Fi Direct technique which allows print and content sharing through free communication between Wi-Fi devices without an AP or a router. Wi-Fi Direct, which is also referred to as Wi-Fi Peer-to-Peer (P2P), can operate by grouping a P2P group owner and a P2P client.

A protocol emerging in this field, called Wi-Fi Display communication, is a technique for sharing data including a video stream and/or an audio stream between Wi-Fi enabled electronic devices. For example, a Wi-Fi Display source electronic device (hereafter, "source device" or just "source") transmits a video stream and/or an audio stream to a Wi-Fi Display sink electronic device (hereafter, "sink device" or just "sink"). The two devices share the streams and simultaneously output the streams through a screen and/or a speaker. In Wi-Fi Display communication, connectivity is achieved using, for example, Wi-Fi Direct.

Herein, a source device denotes a device transmitting the video stream and/or the audio stream, and a sink device denotes a device receiving the video stream and/or the audio stream.

A standard for the Wi-Fi Display communication is described in a Wi-Fi Display specification defined by the Wi-Fi alliance, which is a consortium of companies and entities establishing wireless protocols.

The Wi-Fi Display communication for transmitting data from the Wi-Fi Display source device to the Wi-Fi Display sink device includes Wi-Fi Display (WFD) device discovery, WFD connection setup, WFD capability negotiation, and WFD session establishment. Besides these, the WFD communication can further include a plurality of selective operations such as link content protection.

When the WFD session is established, data is transmitted from the WFD source device to the WFD sink device.

WFD session establishment, and the stream transmission from the WFD source device to the WFD sink device, will now be explained. The WFD source device decodes an encoded stream which is stored therein or received from another medium such as Internet, and outputs the decoded video stream through the screen and the audio stream through the speaker. Herein, encoding refers to at least compressing of the video stream and/or the audio stream. For example, the video stream is compressed in the format of Moving Picture Expert Group (MPEG)-4 of International Standard Organization (ISO)-International Electronic Commission (IEC) or H264 of International Telecommunications Union-Telecommunication standard sector (ITU-T), and the audio stream is compressed in the format of Linear Pulse Coded Modulation (LPCM) 44.1, LPCM 16-48, Advanced Audio Coding (AAC), AC-3, Authentication, Authorization, and Accounting (AAA), Adaptive Multi Rate (AMR), Windows Media Audio (WMA), MPEG-2 Audio, or MPEG-4 Audio.

The WFD source device encodes the raw streams (e.g., video stream and audio stream) that have been decoded and output through the screen/speaker, and transmits the newly encoded stream to the WFD sink device. The WFD sink device decodes the encoded stream received from the WFD source device, and outputs the video stream through the screen and the audio stream through the speaker. Hence, the WFD source device and the WFD sink device share the audio and video streams.

Thus, the WFD source device decodes the encoded stream stored therein or received through another medium such as Internet, outputs the audio/video streams through the screen/speaker, and re-encodes the streams in order to transmit the output raw stream. However, encoding the video stream is time consuming. The video stream requires an encoding time about 10 times that of the audio stream, which may differ according to performance of a hardware encoder or a software encoding module. In a camera application, a portable communication terminal, which is an example of the WFD source device, often captures an image using an embedded digital camera when taking a video, a large number of images are captured using continuous shooting. With the large amount of data generated, encoding is necessary to store or send the captured images to another person. As the portable terminal frequently uses the encoder (or the software encoding module) for encoding images and the amount of the image data to process increases, this puts a strain on device resources.

Hence, in the WFD communication, it is required to address the much encoding time of the WFD source electronic device by modifying the method of the WFD source electronic device for decoding the encoded video stream, outputting the raw video stream through the screen, and re-encoding and transmitting the output video stream.

BRIEF SUMMARY OF THE INVENTION

To address the above-discussed deficiencies of the prior art, it is a primary aspect of the present invention to provide an electronic device for improving a method for encoding and transmitting a decoded output stream.

Another aspect of the present invention is to provide a stream transmitting method for improving encoding and transmission of a decoded output stream.

Yet another aspect of the present invention is to provide an electronic device for improving a method for encoding and transmitting a decoded output video stream.

Still another aspect of the present invention is to provide a transmitting method for improving encoding and transmission of a decoded output video stream.

A further aspect of the present invention is to provide a video stream receiving device which corresponds to the improved electronic device.

A further aspect of the present invention is to provide a video stream receiving method which corresponds to the improved transmitting method.

According to an exemplary embodiment of the present invention, a method operable in a first (source) electronic device includes determining whether an encoding format of an encoded video stream is a format decodable by a second electronic device, and decoding and outputting a frame of the encoded video stream through an output device of the first electronic device, and transmitting the encoded video stream to the second electronic device wherein the transmitting the encoded video stream to the second electronic device is transmitting the encoded video stream without re-encoding it after delaying by a determined time from frame time information of the encoded video stream.

According to an exemplary embodiment of the present invention, a method for processing a video stream in a second electronic device includes confirming a delay time for delaying and outputting an encoded video stream, from a frame of the encoded video stream received from a first electronic device; and decoding and outputting the encoded video stream through an output device of the second electronic device, by delaying the video stream by the delay time.

According to an exemplary embodiment of the present invention, first and second electronic devices each include one or more processors; a memory; and one or more modules stored to the memory to be executed by the one or more processors. The module includes instructions to carry out methods in accordance with the invention.

Computer readable storage media store one or more programs which comprise instructions which, when executed by an electronic device, cause the device to execute methods in accordance with the invention.

Other aspects, advantages, and salient features of the invention will become apparent to those skilled in the art from the following detailed description, which, taken in conjunction with the annexed drawings, discloses exemplary embodiments of the invention.

Certain embodiments of the invention may exhibit the following advantage: when the stream is transmitted from the source device to the sink device, it is possible to enhance the method of the source device for decoding the encoded video stream, outputting the raw video stream through the screen, and re-encoding and transmitting the output video stream.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to a method for transmitting at least a video stream between electronic devices which communicate with each other according to a short range communication scheme, and an electronic device for performing the method. Examples of a suitable short range communication scheme include, but are not limited to, a Wi-Fi Display scheme, a Bluetooth scheme, a short range wire communication scheme, a near field communication scheme and wireless local area network scheme. Hereunder, embodiments of the invention will be described in the context of a Wi-Fi Display scheme, but it is understood that other communication environments are also within the scope of the invention.

Figure 1A:
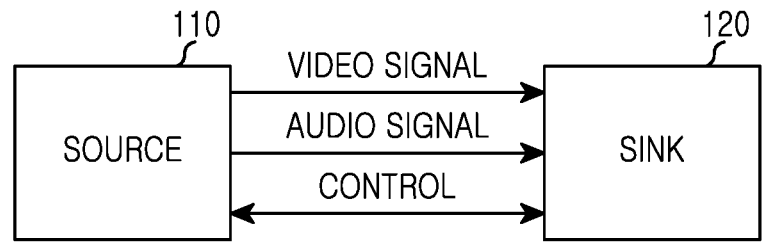
FIG. 1A, FIG. 1B and FIG. 1C are simplified block diagrams illustrating transmission of signals between source and sink devices in accordance with embodiments of the invention.
Figure 1B:
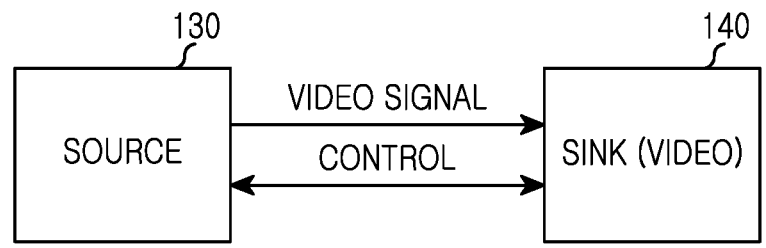
Figure 1C:
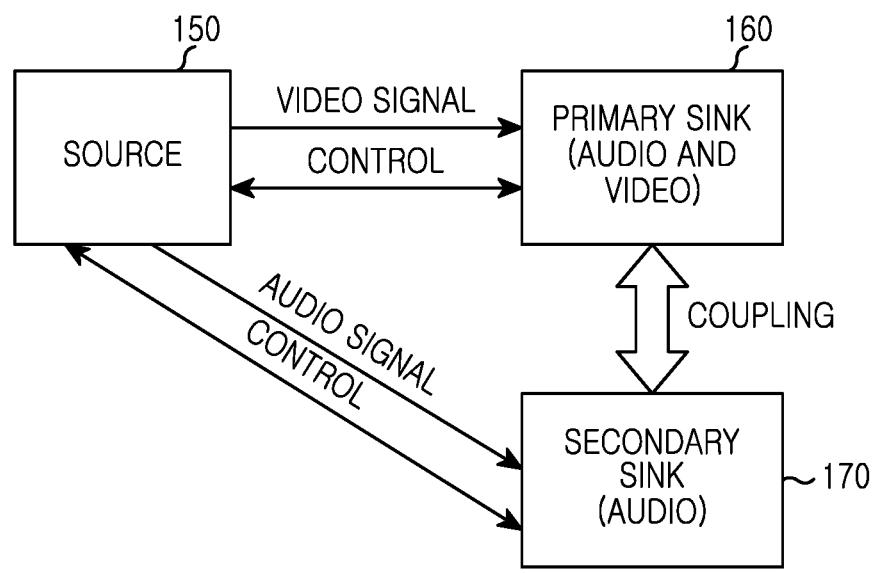

FIGS. 1A to 1C are simplified block diagrams illustrating transmission of signals between source and sink devices in accordance with embodiments of the invention. Referring to FIG. 1A, Wi-Fi Display (WFD) compatible source device 110 (hereafter referred to as "the source device" or just "the source" for brevity) transmits audio and video signals to a WFD compatible sink device 120 (hereafter referred to as "the sink device" or just "the sink" for brevity). An audio/video (A/V) signal that is stored on a first media device and transmitted to and played on another media device is said to be "streamed" to the second device; thus, "audio signal" and "video signal" as used herein will be interchangeably referred to as an "audio stream" and a "video stream," respectively. An audio or video "stream" herein will also refer to an audio/video frame sequence read from memory within the same device. The audio and video signals are also referred to as audio and video payloads in Wi-Fi Display specifications. In the various embodiments herein, the source device may have pre-stored the A/V signals that are subsequently streamed to the sink device. Or, just prior to streaming the A/V signals to the sink, the A/V signals are received by the source from an external device such as from the Internet, e.g., in real time, and momentarily stored. Control signals are exchanged between the source and sink devices when necessary. For example, a control signal can be sent from the source to the sink so as to control the sink to play, stop, or pause the video and/or audio stream.

The WFD-based communication for transmitting data from the source to the sink includes WFD device discovery, WFD connection setup, WFD capability negotiation, and WFD session establishment. Further, the WFD communication selectively executes link content protection.

In the WFD communication of FIG. 1A, when the source device transmits the video stream to the sink device, the source transmits its stored encoded video stream to the sink, rather than re-encoding the decoded video stream output through an output device (a screen) of the source and streaming the re-encoded video to the sink. In so doing, the source device delays the encoded video stream by a certain time from frame time information of the encoded video stream (described further below in connection with FIGS. 9-10). In the WFD communication of FIG. 1A, when the source device transmits the video and audio streams to the sink device, the video stream and audio stream transmitted can be differentially processed. Here, such differential processing transmits the encoded video stream stored at the source device, to the sink device. However, the differential processing re-encodes the decoded audio stream output through the speaker of the source device, and transmits the re-encoded audio stream. That is, for the video stream, the source transmits the encoded video stream stored therein, to the sink or transmits the video stream including output delay information, rather than decoding the encoded video stream, re-encoding the raw video stream output through the screen of the source, and transmitting a re-encoded video stream to the sink. Alternatively, no differential processing is used, such that the audio stream can also be handled in an analogous manner as the video stream, i.e., it is transmitted to the sink device in its original encoded form, without decoding and re-encoding.

In the operations of FIGS. 1A, 1B, and 1C, signals are encoded, which includes a compression method, to reduce the amount of data needed for storage and transmission. The encoding converts the type or form of the information into other types or forms for standardization, security, processing rate enhancement, or storage space saving. For example, the video stream and/or the audio stream is/are compressed according to a certain format. Suitable examples for video stream compression include MPEG-4 or H264 format, examples for the audio stream are LPCM44.1, LPCM16-48, AAC, AC-3, AAA, AMR, WMA, MPEG-2 Audio or MPEG-4 Audio format.

The decoding converts the encoded information back to the original information. Mostly, the decoding is the reverse process of the encoding. The decoding decompresses the encoded audio and/or video streams and outputs the raw stream. The video raw stream indicates, for example, Luminance, Blue-Y, Red-Y (YUV) or Red, Green, Blue (RGB) stream.

FIG. 1B depicts an example in which only a video stream is transmitted from a WFD source device 130 to a WFD sink device 140 in the WFD communication according to an exemplary embodiment of the present invention. Here, the control signal function may be substantially the same as for that of FIG. 1A. The WFD communication session establishment can also be the same as in FIG. 1A.

In the WFD communication of FIG. 1B, the video can be streamed from the source to the sink in the same manner as explained above for FIG. 1A. That is, when the source transmits the video stream to the sink device, the source transmits its stored encoded video stream to the sink, rather than re-encoding the decoded video stream output through its output device (the screen) and transmitting the re-encoded video stream to the sink. In so doing, the source delays the encoded video stream by a certain time from the frame time information of the encoded video stream, or may include the output delay information to the video stream.

FIG. 1C depicts an example in which the video stream is transmitted from a WFD source device 150 to a primary WFD sink device (hereafter, referred to as a first sink device) 160 and the audio stream is transmitted to a secondary WFD sink device (hereafter, referred to as a second sink device) 170 in the WFD communication according to an exemplary embodiment of the present invention. Here, the control signal function has been explained in FIG. 1A. The session establishment in the WFD communication as described in FIG. 1A is applied between the source and the first sink device and between the source and the second sink device in FIG. 1C. In this example, the first sink device and the second sink device are coupled. For example, the coupling allows the primary sink 160 and secondary sink 170 to share the audio and video streams that are streamed to them by the source device 150.

In the WFD communication of FIG. 1C, when the source transmits the video stream to the first sink, the source transmits its stored encoded video stream to the first sink, rather than re-encoding the decoded video stream output through its output device (the screen) and transmitting the re-encoded video stream to the sink. In so doing, the source delays the encoded video stream by a certain time from the frame time information of the encoded video stream, and may transmit the video stream including the output delay information.

Figure 2:
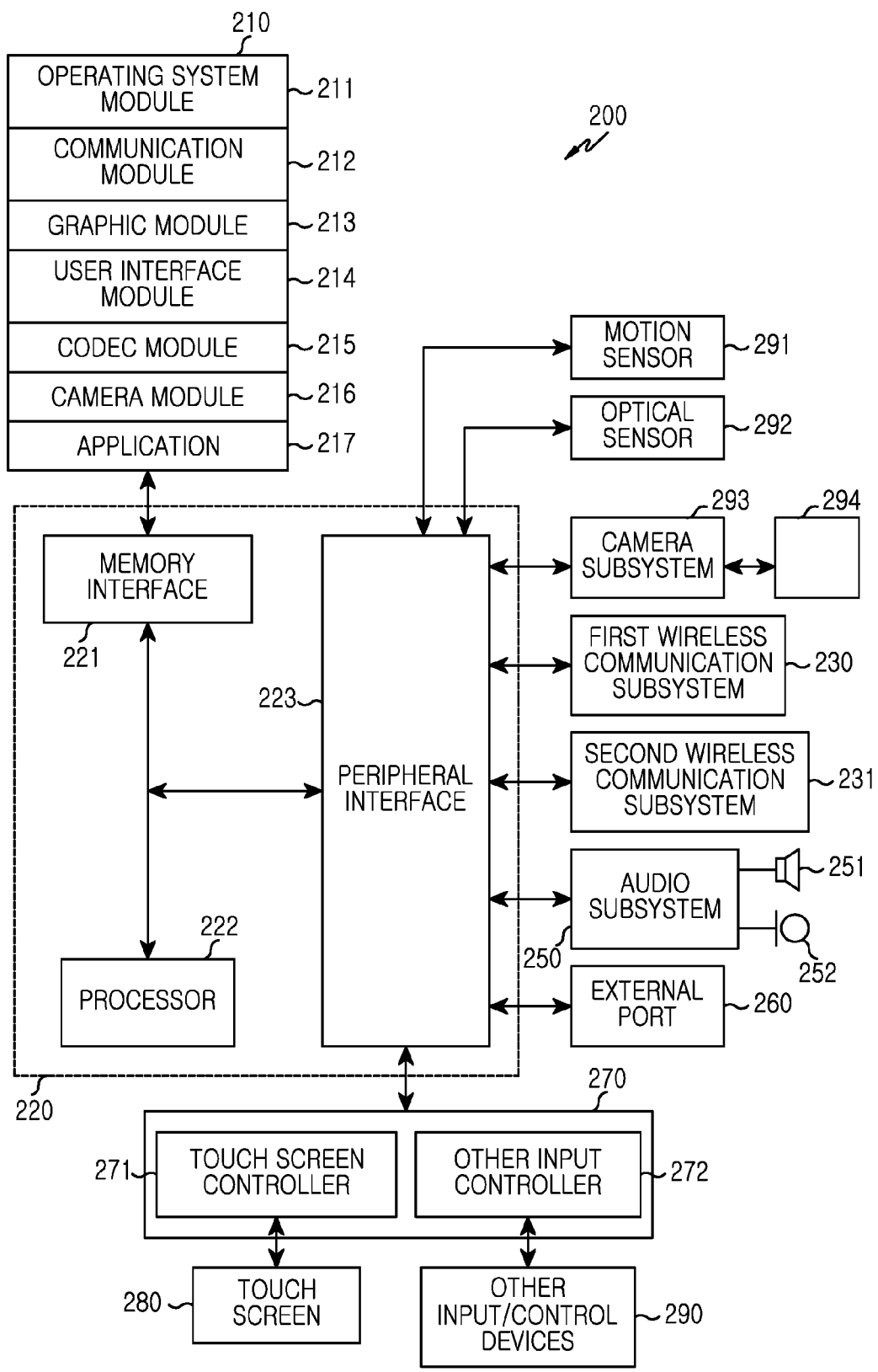
FIG. 2 is a block diagram of a WFD source device according to an exemplary embodiment of the present invention.

When the video stream and the audio stream are transmitted to separate sink devices, as in the case of FIG. 1C, the video stream and the audio stream can be processed and transmitted in different fashions. In particular, the video streamed to the first sink 160 can be the originally encoded video, i.e., without re-encoding it, whilst the audio streamed to the second sink 170 can be re-encoded audio, as described above for FIG. 1A. FIG. 2 is a block diagram of a WFD device, 200, which can operate as either any source or sink device to perform the operations described in connection with FIGS. 1A-1C. The following description will pertain to its operation as a source device. Source device 200 can be a portable (i.e., handheld) electronic device or a portable terminal, e.g., smart phone, mobile phone, mobile pad, media player, tablet computer, handheld computer, digital camera, or Personal Digital Assistant (PDA). The source device 200 may be a portable electronic device combining two or more functions of those devices.

The source device 200 includes a memory 210, a processor unit 220, a first wireless communication subsystem 230, a second wireless communication subsystem 231, an external port 260, an audio subsystem 250, a speaker 251, a microphone 252, an Input/Output (I/O) system 270, a touch screen 280, and other input or control devices 290. A plurality of memories 210 and a plurality of external ports 260 can be used.

The processor unit 220 can include a memory interface 221, processor 222, and a peripheral interface 223. Memory interface 221, processor 222, and/or the peripheral interface 223 can be separately provided or integrated onto one or more integrated circuits.

The processor 222 (which may actually comprise multiple processors) performs various functions for the electronic device 200 by running various software programs, and processes and controls voice communication and data communication. In addition to such typical functions, the processor 222 also executes software modules (instruction sets) stored in memory 210 and performs various particular functions corresponding to the modules. That is, the processor 222 carries out methods according to exemplary embodiments of the present invention in association with software modules stored in memory 210.

Hereafter, an encoded video stream received by a source device from an external source such as the Internet, or retrieved from memory of the source device for reproduction and display on the device's screen will be referred to simply as "the encoded video stream". When the video stream is received from an external source, it is temporarily stored in memory prior to decoding. In various embodiments, the processor 222 compares an encoding format of the encoded video stream to an encoding format(s) supported by a target sink device. When the encoding format of the encoded video stream is supported for decoding in the sink device, the encoded video stream is streamed to the sink device without a re-encoding operation. The processor 222 decodes the encoded video stream by executing a CODEC module 215 of the memory 210, and outputs the decoded video stream through a touch screen 280. In order to display the reproduced video streams at the source and transmit the streams to the sink devices synchronously, the encoded video stream is delayed by a certain time from the frame time information of the encoded video stream and then transmitted to the sink electronic device. Alternatively, in order to inform the sink device that transmitted encoded video stream is non-decoded video stream and therefore it needs time to decode the encoded video streams at the source device, the encoding video stream including the output delay time information is transmitted to the sink electronic device. (Both of these approaches are explained below in connection with FIGS. 9-10.)

The processor 222 can include one or more data processors, an image processor, and a CODEC (realized by executing the instructions of CODEC module 215). The data processor, the image processor, and the CODEC may be separately provided. Alternatively, processor 222 includes a plurality of processors for performing different functions. The peripheral interface 223 connects the I/O subsystem 270 of the electronic device 200 and various peripherals to the processor 222. A memory interface 221 connects processor 222 to the memory 210.

The various components of the source electronic device 200 can be coupled using one or more communication buses or one or more stream lines.

The external port 260 is used to connect the electronic device 200 to other electronic devices directly or indirectly via a network (e.g., Internet, intranet, and wireless LAN). The external port 260 can be, for example, but not limited to, Universal Serial Bus (USB) port or a FIREWIRE port.

A motion sensor 291 and a first optical sensor 292 are coupled to the peripheral interface 223 to allow various functions. For example, the motion sensor 291 and the first optical sensor 292 are coupled to the peripheral interface 223 to detect motion of the electronic devices and the light from the outside. Besides these, a positioning system and other sensors such as temperature sensor or bionic sensor can be coupled to the peripheral interface 223 to perform their functions.

A camera subsystem 293 is coupled to a second optical sensor 294 to perform camera functions such as photo and video clip recording.

The first optical sensor 292 and the second optical sensor 294 can employ a Charged Coupled Device (CCD) or a Complementary Metal-Oxide Semiconductor (CMOS) device.

The communication function is conducted through the one or more wireless communication subsystems 230 and 231. The wireless communication subsystems 230 and 231 can include radio frequency receiver and transmitter and/or optical (e.g., infrared light) receiver and transmitter. The first wireless communication subsystem 230 and the second wireless communication subsystem 231 can be distinguished based on the communication network of the electronic device 200. For example, the communication network can include a communication subsystem designed to operate over, but not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDM) network, a Wi-Fi network, a WiMax network and/or a Bluetooth network. For WFD implementations of the invention, for instance, Wi-Fi communication is performed over a Wi-Fi network using the first subsystem 230. In this case, the second subsystem 231 can be designed for short-range communication that enables data streaming to a sink device. The first wireless communication subsystem 230 and the second wireless communication subsystem 231 may be integrated into a single wireless communication subsystem.

The audio subsystem 250 can be coupled to the speaker 251 and the microphone 252 to process the input and the output of the audio stream such as voice recognition, voice reproduction, digital recording, and telephone function. That is, the audio subsystem 250 communicates with a user through the speaker 251 and the microphone 252. The audio subsystem 250 receives the data stream through the peripheral interface 223 of the processor unit 220 and converts the received data stream to an electric signal. The converted electric signal is fed to the speaker 251. The speaker 251 converts the electric signal to a sound wave audible by the user and outputs the sound wave. The microphone 252 converts the sound wave from the user or other sound sources to an electric signal. The audio subsystem 250 receives the converted electric signal from the microphone 252. The audio subsystem 250 converts the received electric signal to the audio data stream and sends the converted audio data stream to the peripheral interface 223. The audio subsystem 250 can include an attachable and detachable ear phone, head phone, or head set.

The I/O subsystem 270 can include a touch screen controller 271 and/or an other input controller 272. The touch screen controller 271 can be coupled to the touch screen 280. The touch screen 280 and the touch screen controller 271 can detect the contact and the motion for detecting touch gestures using, but not limited to, capacitive, resistive, infrared and surface sound wave techniques for determining one or more contact points with the touch screen 280 and a multi-touch detection technique including various proximity sensor arrays or other elements. The other input controller 272 can be coupled to the other input/control devices 290. The other input/control devices 290 can include one or more up/down buttons for controlling the volume of the speaker 251 and the microphone 252. The button can employ a push button or a rocker button. The other input/control devices 290 can employ a rocker switch, a thumb wheel, a dial, a stick, and/or a pointer such as stylus.

The touch screen 280 provides the I/O interface between the electronic device 200 and the user. That is, the touch screen 280 forwards the user's touch input to the processor 220. The touch screen 280 also includes a display that functions as a medium for displaying the output of the electronic device 200 to the user. Visual output on the display can be represented as text, graphic, video, and a combination of these. Thus the encoded video stream is decoded and the resulting video is reproduced on the display of the touch screen.

The touch screen 280 can employ various displays, examples of which include but are not limited to, Liquid Crystal Display (LCD), Light Emitting Diode (LED), Light emitting Polymer Display (LPD), Organic LED (OLED), Active Matrix OLED (AMOLED) or Flexible LED (FLED).

The memory 210 can be coupled to the memory interface 221. The memory 210 can include fast random access memory (RAM) such as one or more magnetic disc storage devices and/or non-volatile memory, one or more optical storage devices, and/or a flash memory (e.g., NAND and NOR). When the encoded video stream is received by device 200 from an external source, it is temporarily stored in the RAM during the course of the decoding process.

The memory 210 stores software. Software components include an operating system module 211, a communication module 212, a graphic module 213, a user interface module 214, a CODEC module 215, a camera module 216, and one or more application modules 217. The modules being the software components can be represented as a set of instructions, and thus the module can be referred to as an instruction set. Also, the module may be referred to as a program.

One or more modules including the instructions for performing the various methods of the present invention can be stored to the memory 210.

The operating system software 211 (the embedded operating system such as WINDOWS, LINUX, Darwin, RTXC, UNIX, OS X, or VxWorks) includes various software components for controlling general system operations. These include, e.g., memory management and control, storage hardware (device) control and management, and power control and management. The operating system software 211 processes the normal communication between various hardware (devices) and software components (modules).

The communication module 212 allows communication with an external electronic device such as a computer, server, and/or portable terminal, through the wireless communication subsystems 230 and 231 or the external port 260.

The graphic module 213 includes various software components for providing and displaying graphics on the touch screen 280. The term 'graphics' encompasses text, webpage, icon, digital image, video, and animation.

The user interface module 214 includes various software components relating to a user interface. The user interface module 214 is involved in the status change of the user interface and the condition of the user interface status change.

The CODEC module 215 can include software components relating to the encoding and the decoding of the video file. The CODEC module 215 can include a video stream module such as MPEG module and/or H204 module. The CODEC module 215 can include various audio file CODEC modules for AAA, AMR, and WMA. The application module 217 may include instruction sets for carrying out methods of the present invention as described herein. Frame time information of the encoded video stream stored to the source electronic device can obtain time information of the whole frame and/or time information per frame in a packet header (a frame header) of the parsed encoded video stream or a packet payload (frame payload) region. For example, the time information is contained in data indicating how the audio stream (data) and the video stream (data) are interleaved in the parsed encoded stream. The corresponding frame-based time information can include the output order of the corresponding frame. The corresponding frame-based time information can be a Present Time Stamp (PTS) value being information relating to when to display the frame. The frame includes a Program Clock Reference (PCR) corresponding to the clock, to thus check the time.

To output (i.e., display) the encoded video stream, the frame time information PTS of the decoded video stream can be acquired by monitoring the output frame of the decoded video stream.

Thus, for example, a difference value can be determined by comparing the frame time information PTS of the encoded video stream and the frame time information PTS of the decoded video stream output.

The camera module 216 includes camera related software components allowing camera related processes and functions. The application module 217 may further include a browser, an e-mail, an instant message, a word processing, keyboard emulation, an address book, a touch list, a widget, Digital Right Management (DRM), voice recognition, voice reproduction, a position determining function, and a location based service. The memory 210 can include an additional module (instructions) in addition to those modules. Alternatively, if necessary, part of the modules (instructions) may not be used.

The various functions of the electronic device 200 as stated above and to be explained, can be executed by hardware and/or software and/or their combination including one or more stream processing and/or Application Specific Integrated Circuits (ASICs).

Figure 3:
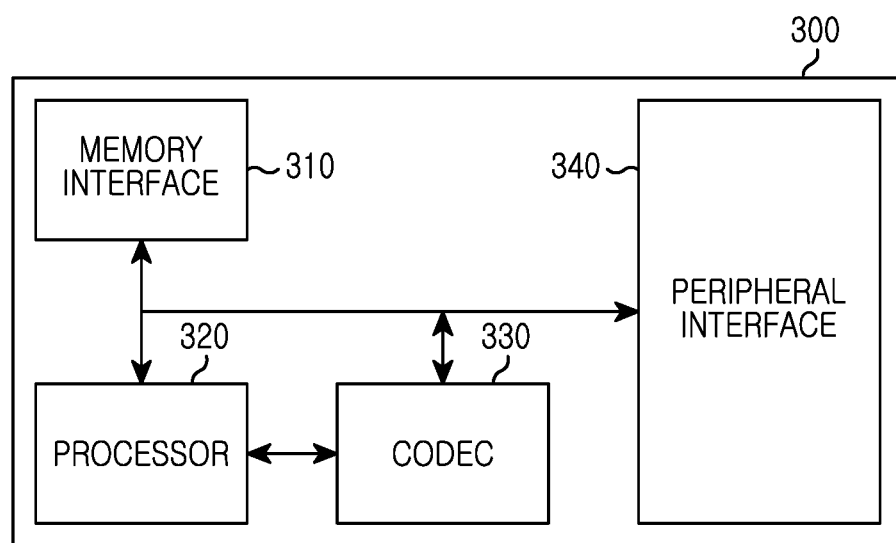
FIG. 3 is a block diagram of a processor unit of FIG. 2 according to an exemplary embodiment of the present invention.

FIG. 3 is a block diagram depicting an alternative embodiment of a processor unit, 300, that may be used in place of processor unit 220 of FIG. 2. Processor unit 300 includes a memory interface 310, a peripheral interface 340, a processor 320, and a CODEC 330. Processing unit 300 differs from processing unit 220 by implementing the CODEC 330 in hardware, rather than the software implementation of the CODEC function as in processing unit 220. The processor 320 is configured to execute methods according to the present invention in association with the CODEC 330 and via the execution of the software modules stored to the memory 210. That is, processor 320 and the CODEC 330 can together carry out methods according to the present invention as exemplified herein.

When the device 200 is used as a sink device, i.e., used in a sink device mode, the processor 220 controls corresponding operations to carry out the sink device functions described herein, in accordance with instructions read from memory 210. Such operations can include receiving and processing the video stream and the audio stream from the source device, decoding the video stream and displaying reproduced video in sync with the video reproduction in the source device. Decoding is carried out in the same fashion as for the source device mode.

Figure 4:
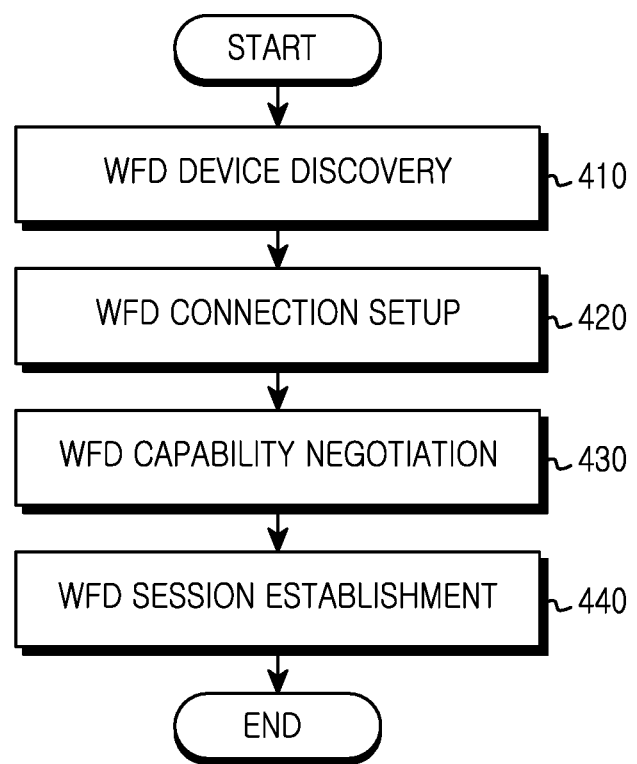
FIG. 4 is a flowchart of WFD communication session establishment for transmitting the stream from the WFD source device to the WFD sink device according to an exemplary embodiment of the present invention.

FIG. 4 is a flowchart of WFD communication session establishment for transmitting the AN stream from the WFD source device to the WFD sink device according to an exemplary embodiment of the present invention. To commence the WFD communication, WFD device discovery 410, WFD connection setup 420, WFD capability negotiation 430, and WFD session establishment 440 are performed. For secure data transfer, link content protection (not shown) is also selectively conducted. After the WFD session is established, the video stream and the audio stream can be transmitted between the WFD devices (from the source to the sink device).

In the WFD device discovery 410, the source and sink devices confirm the mutual presence. The WFD connection setup 420 determines which method uses the WFD connection. For example, the WFD connection setup determines Wi-Fi or other short range communication parameters to use for the WFD connection. The WFD capability negotiation 430 determines the sequence of the message exchange between a Real Time Streaming Protocol (RTSP) source device and a RTSP sink device. The RSTP message exchange sequence is determined in order to determine parameters defining the video/audio streams transmitted from the source device to the sink device. In this step, the encoding format (i.e., encoding format information) of the video stream decodable by the sink device can be transmitted from the sink to the source device. Examples of the video stream format information include but are not limited to H264 or MPEG-4. When determining a sequence of message exchange between the source and sink devices and determining parameters of the transmitted video/audio streams, the sink device can transmit the encoding format information of the decodable video stream to the source device.

The WFD session establishment 440 establishes the session between the source and sink devices. When the session is established, the source device can transmit its selected stream to the sink device. The stream is transmitted between the source device and the sink device according to the present method. In addition, a plurality of optional steps such as link content protection for security of the content transmitted from the source to sink devices can be conducted in necessary phases. The link content protection can configure a High-bandwidth Digital Content Protection (MCP) 2.0 session key in the content.

Figure 5A:
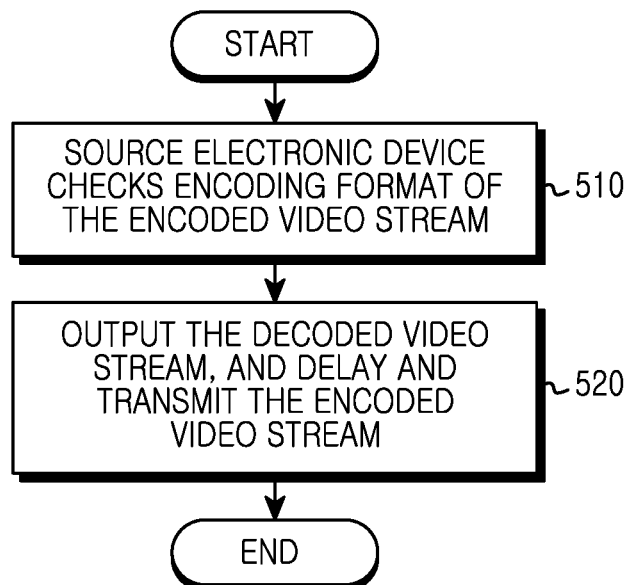
FIG. 5A is a flowchart of WFD communication session establishment for transmitting the video stream from the source device to the sink device according to an exemplary embodiment of the present invention.

FIG. 5A is a flowchart of the WFD communication session establishment for transmitting the video stream from the source device to the sink device according to an exemplary embodiment of the present invention. The source device checks the encoding format of the encoded video stream and compares the encoding format to a format decodable and displayable by the sink device in step 510. To this end, prior to the comparison, the source device obtains information of at least one decodable format of the sink device. That is, before checking the encoding format of the encoded video stream, the source device can receive the encoding format (i.e., encoding format information) of video decodable by the sink device, from the sink device Examples of encoding formats include but are not limited to H264 and MPEG-4. The sink device may be capable of decoding a plurality of encoding formats of the video stream. The encoding format information of video decodable by the sink device can be received in, for example, the WFD capability negotiation 430 of FIG. 4. That is, when determining the sequence of message exchange between the source device and the sink device and determining the parameters of the transmitted video/audio streams, the encoding format information of decodable video can be received from the sink device. The sink device can transmit the encoding format information of the video stream using a control signal, a frame header (e.g., a packet header in a packet transmission), or a particular location of the frame payload (e.g., a packet payload of a packet transmission).

Before checking the encoding format of the encoded video stream in step 510, the source device can send a request to the sink device the request inquiring about whether the encoding format of the encoded video stream, is a decodable format of the sink device, and can receive a response to the request from the sink device, which are not depicted in the drawing. These operations can be performed in the WFD capability negotiation 430 of FIG. 4.

In step 520, the source device decodes the video stream and outputs the video on its own display. In addition, if determined in the format comparison of step 510 that the sink device's decoding format is compatible with the format of the encoded video stream, the encoded video stream is transmitted to the sink device. This is done without a decoding and re-encoding operation as in conventional methods. If the encoded video stream is part of an interleaved A/V stream ("the A/V stream") with video data interleaved with audio data, the video stream is first extracted from the A/V stream before decoding and transmitting. That is, the A/V stream can be parsed and split to the encoded audio stream and the encoding video stream. The A/V stream can be, but not limited to, an encoded data stream downloaded from another electronic device and stored to the source device, or obtained from another component such as a camera subsystem of the source device, or received as a data stream streamed over the Internet. The parsing can be realized using hardware or software. Using software, an instruction set for the parsing can be provided as a separate parsing module or as part of the CODEC module and stored to the memory 210 of FIG. 2. The parsed video and audio streams are stored to the source device. The storage location(s) can be part of the memory interface, part of a peripheral interface, or a separate buffer memory (RAM).

When the decoded video stream is displayed at the source device and the encoded video stream is transmitted in step 520, intentional delays can be introduced at either one or both of the source and sink devices, in order that the display of the encoded video stream at the source and the transmission of the encoded video stream to the sink devices are in synchronization. Frame time information of the encoded video stream can be obtained from the time information of the whole packet and/or the time information per frame constructing the packet, in the packet header (frame header) or the packet payload (frame payload) of the parsed encoded video stream. The frame time information can correspond to Picture Parameter Set (PPS) and Sequence Parameter Set (SPS) in the MPEG format. The corresponding frame time information can include the output order of the corresponding frames. The corresponding frame time information can be the PTS value which is information about when the corresponding frame is displayed. Since the frame includes the PCR corresponding to the clock, the time can be checked.

The frame time information PTS of the decoded video stream to output the encoded video stream can be acquired by monitoring the output frame of the decoded video stream.

Hence, for example, the time taken for decoding can be calculated as a time difference value determined by comparing the frame time information PTS of the encoded video stream and the frame time information PTS of the decoded and output video stream.

In addition, a link delay for transmitting the video stream from the source to the sink can be determined. The link delay includes modulation and other processing delays occurring at the source device, and propagation delay. In this case, the time difference may be the time taken for decoding at the source device extracted by the link delay.

Further, a receiver/demodulation delay at the sink device ("sink delay") can be determined. The sink delay includes demodulation delays at the sink device. In this case, the time difference may be the time taken for decoding at the source device extracted both by the link delay and the sink delay. The "link delay" may be determined as ½ of a Round Trip Time (RTT) value between the source device and the sink device. The RTT indicates the time taken for the source device to receive acknowledgement from the sink device in response to the transmitted stream. A method for measuring the RTT value can adopt any suitable one of well-known methods.

In addition, a sink device decoding time, i.e., the time taken for the sink device to receive, decode, and output the encoded video stream through its output device can be measured by the sink device. That is, the received frame time information of the encoded video stream can be confirmed in the packet header (frame header) or the packet payload (frame payload) of the parsed encoded video stream. The frame time information can correspond to the PPS and the SPS in the MPEG format. As the frame includes the PCR corresponding to the clock, the time can be checked. The output time of the video stream decoded to output the encoded video stream can be obtained by monitoring the output frame of the decoded video stream.

The time value from the stream reception to the received stream output in the sink device can be notified to the source device using the control signal, the packet header, or a particular region of the packet payload. The particular region of the packet payload can be designated in the WFD capability negotiation 430 of FIG. 4 between the source device and the sink device.

Figure 9:
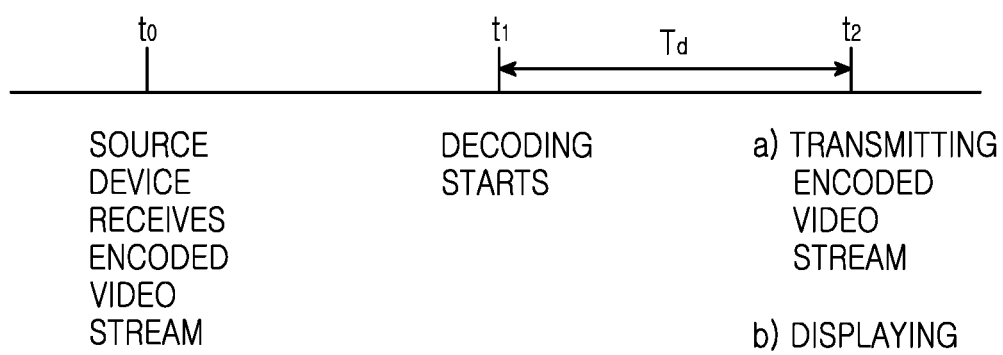
FIG. 9 is a timing diagram illustrating exemplary timing for the various operations that occur in the method of FIG. 5A.

FIG. 9 is a timing diagram illustrating exemplary timing for the various operations that occur in the method of FIG. 5A. For simplicity of explanation, an example of streaming a single video frame of a video stream is presented. At an initial time to, it is assumed that the source device receives an encoded video frame from an external device or internal component such as a camera, or retrieves the video frame from device memory. (Herein, "receiving" such video or audio stream means either receiving it from an external source or from an internal component or retrieving it from memory such as a video library.) At this time, the source device temporarily stores the frame in RAM. Then, the source device begins to decode the video frame at a time $t_1$ and displays the video frame at $t_2$. Thus a source device decoding delay $T_D$=time $t_2-t_1$ is computed by the source device using, e.g., one of the techniques described above.

At time $t_2$ (after delaying some time), the source device begins to transmit the encoded video frame (and optionally, a corresponding audio frame) to the sink device. At this time $t_1$, the source device is capable of displaying the decoded frame on its screen, i.e., reproducing (outputting) the video frame. An analogous process can be performed for the audio stream.

The operation of the source device for delaying the encoded video stream by the certain time from the frame time information of the encoded video stream and transmitting to the sink device can include packetizing the Please confirm or correct.) The packetization can be MPEG-2-TS container format and encapsulate with a Real Time Protocol (RTP)/Universal Datagram Protocol (UDP)/Internet Protocol (IP) header prior to the packetization according to Institute of Electrical and Electronics Engineers (IEEE) 802.11 standard.

With continuing reference to FIG. 5A, the operation of the source device for checking the encoding format of the encoded video stream in step 510 can include checking the encoding format of the encoded audio stream. That is, the source device checks whether the encoding format of the encoded audio stream, to be decoded and played at the source device speaker, is the decodable format of the sink device. The delaying and transmitting to the sink device the encoded video stream by the certain time from the frame time information of the encoded video stream in step 520 can be done in conjunction with a process of decoding the frame of the encoded audio frame parsed and stored by the source device, outputting it through the speaker of the source device, delaying the encoded audio stream by the certain time from the frame time information of the encoded audio stream information, and transmitting it to the sink device. The processing of the audio stream can be analogous to that of the aforementioned video stream.

For handling the extracted audio stream, the method can alternatively include an operation of the source device decoding and outputting (playing) the audio stream, and re-encoding and transmitting the output audio stream to the sink device (discussed earlier in connection with "differential processing") Instruction sets for the respective operations of FIG. 5A can be included in the CODEC module 215 of the memory 210 of FIG. 2. In this case, the CODEC module 215 stored to the memory 210 can be executed by one or more processors. The instruction sets can alternatively be stored in the application module 217.

Figure 5B:
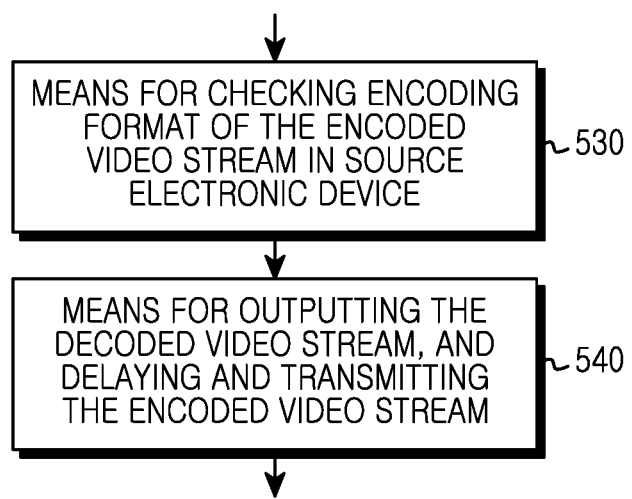
FIG. 5B is a diagram of an apparatus, which corresponds to the method of the flowchart of FIG. 5A, for establishing the WFD communication session for transmitting the video stream from the source device to the sink device according to an exemplary embodiment of the present invention.

FIG. 5B is a diagram of a general apparatus which can carry out method of the flowchart of FIG. 5A, for establishing the WFD communication session for transmitting the video stream from the source device to the sink device according to an exemplary embodiment of the present invention. A means 530 of the source device for checking the encoding format of the encoded video stream determines whether the encoding format of the encoded video stream which is decoded by the source device and output through the output device of the source device, is the decodable format of the sink device. A means 540 for outputting the decoded video stream and transmitting the encoded video stream decodes the frame of the encoded video stream, outputs the decoded frame through the output device of the source device, and transmits the encoded video stream by delaying it by the certain time from the frame time information of the encoded video stream.

In addition, the apparatus can further include a means (not shown) for separating the audio stream and the video stream by parsing the encoded stream which is the interleaved video stream and audio stream, a means (not shown) for receiving the encoding format of the video stream decodable by the sink device from the sink device, a means (not shown) for sending the request inquiring about whether the encoding format of the encoded video stream is decodable by the sink device, and receiving the response of the request from the sink device, and/or a means (not shown) for packetizing the encoded video stream according to the transport stream standard.

In addition, the apparatus can include a means (not shown) of the source device for decoding and outputting the encoded audio stream, and encoding and transmitting the output audio stream to the sink device.

Such means can be implemented using separate or single hardware.

Figure 6A:
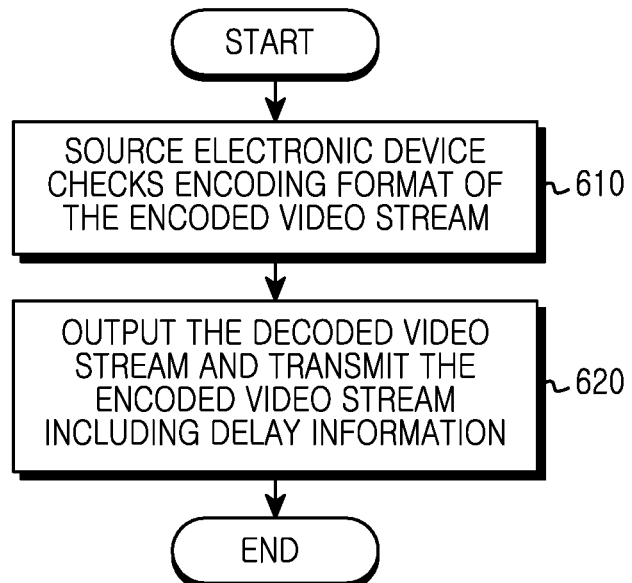
FIG. 6A is a flowchart of WFD communication session establishment for transmitting the video stream from the source device to the sink device according to another exemplary embodiment of the present invention.

FIG. 6A is a flowchart of WFD communication session establishment for transmitting the video stream from the source device to the sink device according to another exemplary embodiment of the present invention. In an operation 610, the source device checks the encoding format of an encoded video stream to be displayed at the source device, and determines whether the encoding format is a decodable format of the sink device. In an operation 620, the source device transmits the encoded video stream including delay information, and decodes and displays the video frame of the encoded video stream. In other words, the source device transmits the encoded video stream to the sink device wherein frame of the encoded video stream includes the delay information of the certain time for delaying and outputting the encoded video stream by the certain time from the frame time information of the encoded video stream. The delay information can be carried by the packet header or a certain region of the packet payload. A particular region of the packet payload can be designated between the source device and the sink device in the WFD capability negotiation 430 of FIG. 4. Also, a particular control signal can carry the delay information.

Before the source device checks the encoding format of the encoded video stream in step 610, the encoding format of the video stream decodable by the sink device can be received from the sink device. This operation can refer to the corresponding explanations in FIG. 5A.

Before the source device checks the encoding format of the encoded video stream in step 610, the request inquiring about whether the encoding format of the encoded video stream, which is decoded by the source device and output through the output device of the source device, is the decodable format of the sink device can be sent from the source device to the sink device, and the response of the request can be received from the sink device. This operation can refer to the corresponding explanations in FIG. 5A.

When the decoded video stream is output and the encoded video stream including the delay information is transmitted in step 620, before the source electronic device decodes the frame of the encoded video stream, the audio stream and the video stream can be separated and stored by parsing the encoded stream of the interleaved video stream and audio stream (which can be referred to the video), which is not illustrated in the drawing. This operation can refer to the corresponding explanations in FIG. 5A.

Figure 10:
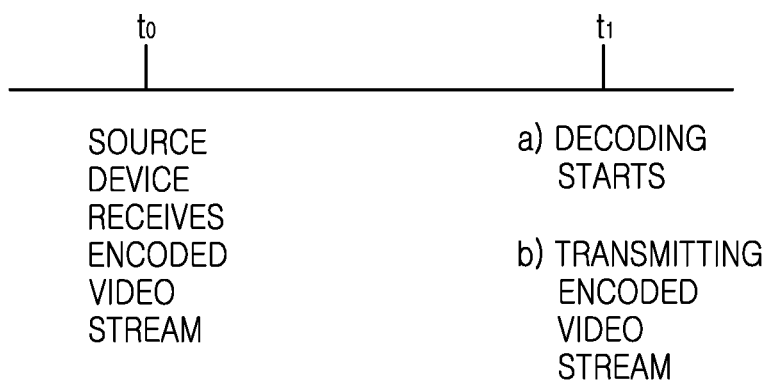
FIG. 10 is a timing diagram illustrating exemplary timing for various operations that occur in the method of FIG. 6A.

FIG. 10 is a timing diagram illustrating exemplary timing of the various operations of the method of FIG. 6A. An example of streaming a single video frame of a video stream is presented. At an initial time $t_0$, it is assumed that an encoded video frame is received or retrieved by the source device. Then, at $t_1$, the source device starts to decode the video stream and transmit the video stream to the sink device. Here, frame of the encoded video stream transmitted from the source device to the sink device includes the delay information of the certain time for delaying and outputting the encoded video stream by the certain time from the frame time information of the encoded video stream. The delay information may be calculated according to the methods described in connection with the FIG. 5A and FIG. 9.

With continued reference to FIG. 6A, before the source device transmits to the sink device by delaying by the certain time from the frame time information of the encoded video stream, the encoded video stream can be packetized according to the transport stream standard. This operation can refer to the corresponding explanations in FIG. 5A.

In addition, the operation 610 of the source device for checking the encoding format of the encoded video stream can include checking the encoding format of the encoded audio stream. That is, this operation determines whether the encoding format of the encoded audio stream which is decoded by the source device and played through the speaker of the source device, is the decodable format of the sink device. The operation 620 for outputting the decoded video stream and transmitting the encoded video stream including the delay information, can decode and output the frame of the encoded audio stream stored by the source device by parsing the encoded stream, through the output device of the source electronic device, and transmit the encoded audio stream to the sink device by including the delay information instructing to delay and output the encoded audio stream by the certain time from the frame time information of the encoded audio stream. The explanations on the audio stream are based on the video stream as mentioned above.

As an alternative to handling the extracted audio stream, as mentioned earlier in reference to differential processing, the source device can decode and play the audio stream, re-encode the output audio stream, and transmit the re-encoded audio stream to the sink device.

Instruction sets for the respective operations of FIG. 6A can be included in the CODEC module 215 of the memory 210 of FIG. 2. In this case, the CODEC module 215 stored to the memory 210 can be executed by one or more processors.

Figure 6B:
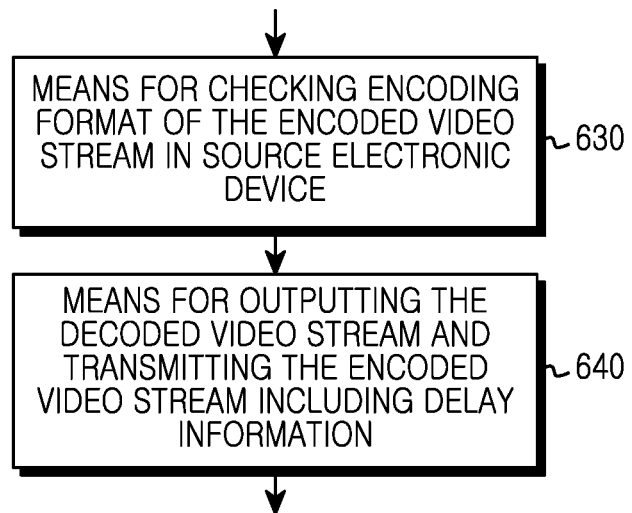
FIG. 6B is a diagram of an apparatus, which corresponds to the method of the flowchart of FIG. 6A, for establishing the WFD communication session for transmitting the video stream from the source device to the sink device according to another exemplary embodiment of the present invention.

FIG. 6B depicts an apparatus, which corresponds to the method of the flowchart of FIG. 6A, for establishing the WFD communication session for transmitting the video stream from the source device to the sink device according to another exemplary embodiment of the present invention. A means 630 of the source device for checking the encoding format of the encoded video stream determines whether the encoding format of the encoded video stream which is decoded by the source device and output through the output device of the source device, is the decodable format of the sink device. A means 640 for outputting the decoded video stream and transmitting the encoded video stream including the delay information decodes and outputs the frame of the encoded video stream, through the output device of the source device, and transmits the video stream to the sink device by including the delay information instructing to delay and output the encoded video stream by the certain time from the frame time information of the encoded video stream.

In addition, the apparatus can further include a means (not shown) for separating the audio stream and the video stream by parsing the encoded stream which is the interleaved video stream and audio stream, a means (not shown) for receiving the encoding format of the video stream decodable by the sink device from the sink device, a means (not shown) for sending the request inquiring about whether the encoding format of the encoded video stream is decodable by the sink device, and receiving the response of the request from the sink device, and/or a means (not shown) for packetizing the encoded video stream according to the transport stream standard.

In addition, the apparatus can include a means (not shown) of the source device for decoding and outputting the encoded audio stream, and encoding and transmitting the output audio stream to the sink device.

Such means can be implemented using separate or single hardware.

Figure 7A:
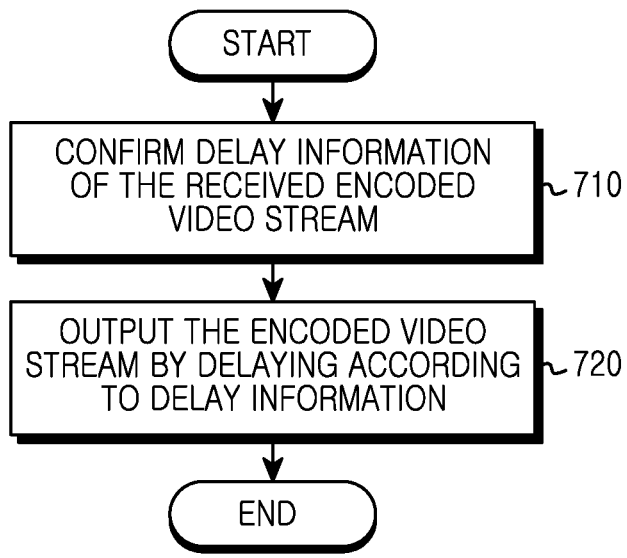
FIG. 7A is a flowchart of the sink electronic device, which receives the video stream from the source device, for receiving and outputting the video stream according to another exemplary embodiment of the present invention.

FIG. 7A is a flowchart of the sink device, which receives the video stream from the source device, for receiving and outputting the video stream of the sink device according to another exemplary embodiment of the present invention. When confirming the output delay information of the received encoded video stream in step 710, the sink device confirms the certain time to delay for decoding and outputting the encoded video stream, from the packet (frame) of the encoded video stream received from the source electronic device. Next, when decoding and outputting the encoded video stream through the output device of the sink device by delaying according to the delay information in step 720, the sink device delays and outputs the time for decoding and outputting the received encoded video stream according to the confirmed delay information.

The method for delaying and outputting can use a method for delaying the decoding timing of the encoded video stream by a certain time corresponding to the delay information.

Alternatively, the method can delay, after decoding the encoded video stream, the output timing of the output device by a certain time corresponding to the delay information.

In addition, the sink device can receive encoded audio from the source device, decode and output the encoded audio stream as described earlier.

Figure 7B:
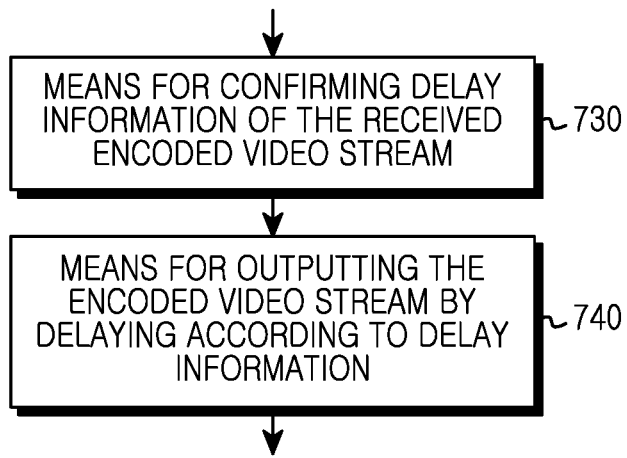
FIG. 7B is a diagram of an apparatus, corresponding to the flowchart of FIG. 7A, for receiving and outputting the video stream of the sink device which receives the video stream from the source device according to another exemplary embodiment of the present invention.

FIG. 7B illustrates an apparatus, corresponding to the flowchart of FIG. 7A, for receiving and outputting the video stream of the sink device which receives the video stream from the source device according to another exemplary embodiment of the present invention. The sink device includes a means 730 for confirming the output delay information of the received encoded video stream, and a means 740 for decoding and outputting the encoded video stream through the output device by delaying according to the delay information. The means 730 for confirming the output delay information of the received encoded video stream confirms the certain time to delay for decoding and outputting the encoded video stream, from the packet (frame) of the encoded video stream received from the source device. The means 740 for decoding and outputting the encoded video stream through the output device by delaying according to the delay information delays and outputs the time for decoding and outputting the received encoded video stream according to the confirmed delay information.

The apparatus can further include a means (not shown) for outputting the decoded video stream by delaying the decoding timing of the encoded video stream by a certain time corresponding to the delay information, or a means (not shown) for delaying the output timing of the output device, after decoding the encoded video stream, by a certain time corresponding to the delay information.

In addition, the sink device can receive an encoded audio stream, and decode and output the encoded audio stream as described above.

Such means can be implemented using separate or single hardware.

Figure 8:
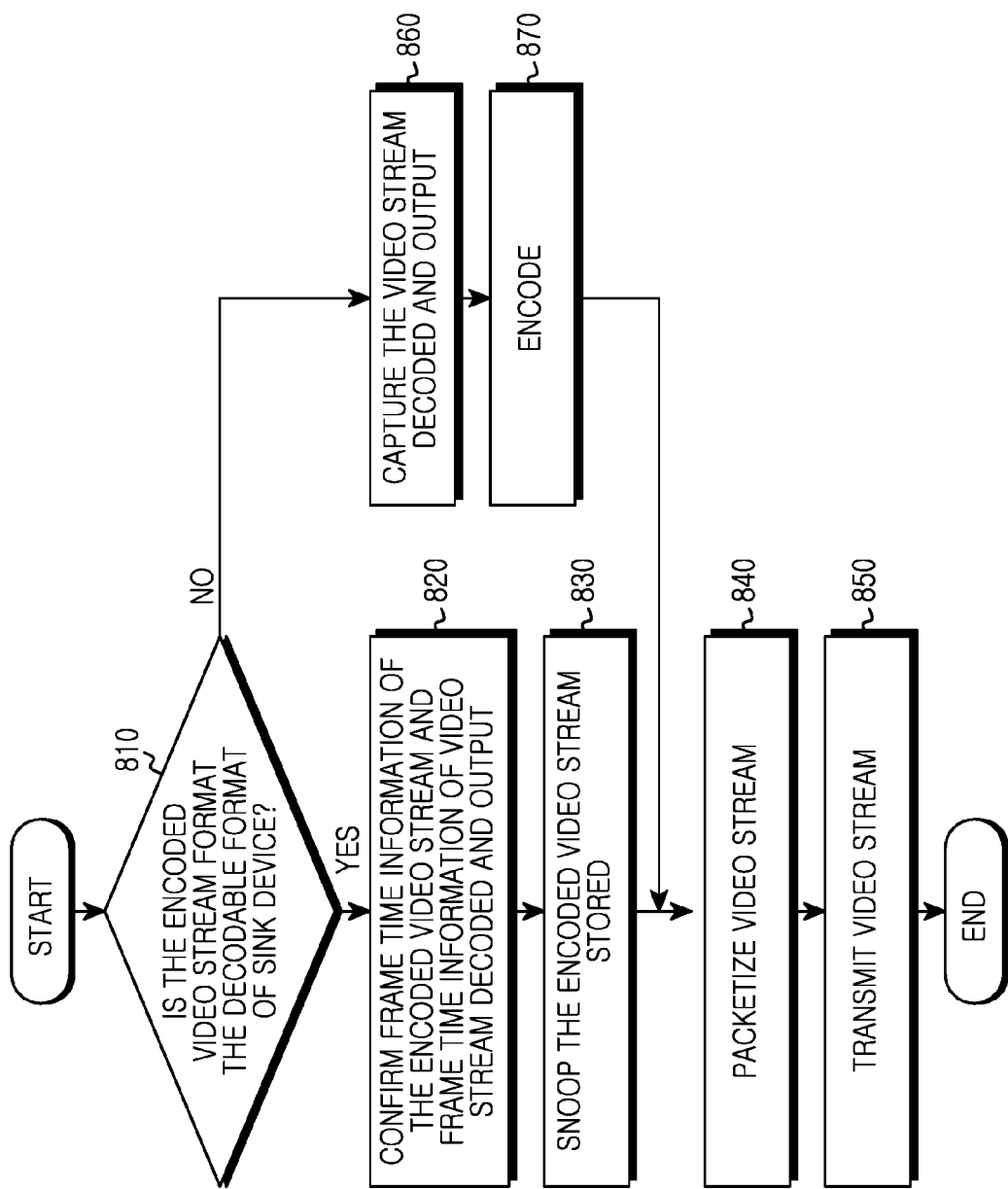
FIG. 8 is a flowchart of WFD communication session establishment for transmitting the video stream from the source device to the sink device according to another exemplary embodiment of the present invention.

FIG. 8 is a flowchart of WFD communication session establishment for transmitting the video stream from the source device to the sink device according to another exemplary embodiment of the present invention.

The method determines whether the encoded video stream of the source device is in the video stream format decodable by the sink device in step 810. That is, the method determines whether the encoding format of the encoded video stream which is decoded by the source device and output through the output device of the source device, is the decodable format of the sink device. For doing so, the operating (not shown) for receiving the encoding format (i.e., encoding format information) of the video stream decodable by the sink device, from the sink device can be preceded. The sink device may decode a plurality of encoding formats of the video stream. The encoding format information of the video stream decodable by the sink device can be received in, for example, the WFD capability negotiation 430 of FIG. 4. That is, when determining the sequence of the message exchange between the source device and the sink device and determining the parameters of the transmitted video/audio streams, the encoding format information of the decodable video stream can be received from the sink device. The sink device can transmit the encoding format information of the video stream using the control signal, the frame header (the packet header in the packet transmission), or the particular location of the frame payload (the packet payload of the packet transmission).

An operation (not shown) for sending from the source device to the sink device the request inquiring about whether the encoding format of the encoded video stream, which is decoded by the source device and output through the output device of the source device, is the decodable format of the sink device, and receiving the response of the request from the sink device can be preceded. This operation can be performed in, for example, the WFD capability negotiation 430 of FIG. 4.

When the encoded video stream of the source device is in the decodable format of the sink device, the method confirms the frame (packet) time information of the encoded video stream stored to the source device, and confirms the frame (packet) time information of the video stream decoded to output the encoded video stream in step 820. (The video stream is concurrently decoded at the source device and output on the screen of the source device at step 820.)

The encoded video stream is obtained by separating and storing the encoded audio stream and the encoded video stream by parsing the encoded stream (the video) which is the interleaved encoded video stream and audio stream.

The encoded stream can be, but not limited to, downloaded from other device and stored to the source device, obtained from the component such as camera subsystem of the source device, or streamed over the Internet. The parsing can be realized using hardware or software. Using the software, the instruction set for the parsing function can be provided as a separate parsing module or as part of the CODEC module and then stored to the memory 210 of FIG. 2. The parsed video stream and audio stream are stored to the source electronic device. Their storage location can be part of the memory interface, part of the peripheral interface, or a separate buffer memory (RAM).

The frame time information of the encoded video stream stored to the source device can be obtained from the time information of the whole packet and/or the time information per frame, in the packet header (frame header) or the packet payload (frame payload) of the parsed encoded video stream. The frame time information corresponds to the PPS and the SPS in the MPEG format. The corresponding frame time information indicates the output order of the corresponding frame. The frame time information of the decoded video stream to output the encoded video stream can be acquired by monitoring the output frame of the decoded video stream. Hence, the difference value can be determined by comparing the frame time information of the encoded video stream and the frame time information of the decoded and output video stream.

The difference value can be produced by subtracting the time taken from the transmission of the source device to the reception of the sink device, from the difference value of the frame time information of the encoded video stream stored to the first storage device and the frame time information of the video stream decoded to output the encoded video stream. The time taken from the transmission of the source device to the reception of the sink device can be ½ of the RTT value between the source device and the sink device.

The difference value may be produced by subtracting the time taken by the transmission of the source device and the sink device and the time taken for the sink device to receive, decode, and output the encoded video stream through its output device, from the difference value of the frame time information of the encoded video stream stored to the first storage device and the frame time information of the video stream decoded to output the encoded video stream. The time taken for the sink device to receive, decode, and output the encoded video stream through its output device can be measured by the sink device. This particular time value can be notified to the source device using the control signal, the packet header, or the particular region of the packet payload. The particular region of the packet payload can be designated during the WFD capability negotiation 430 of FIG. 4 between the source device and the sink device.

Next, in step 830, the method snoops the encoded video stream by applying the difference value of the frame (packet) time information of the encoded video stream and the frame (packet) time information of the decoded video stream to output. The difference value can use the various values as explained earlier. The snooping of the encoded video stream includes delaying the encoded video stream by the difference value in step 830.

In step 840, the encoded video stream is packetized according to the transport stream standard. The packetization can employ, for example, the MPEG-2-TS container format and encapsulate with the RTP/UDP/IP header prior to the packetization according to the IEEE 802.11 standard.

In step 850, the source device transmits the encoded video stream to the sink device.

In addition, when the method determines whether the encoded video stream of the source device is in the video stream format decodable by the sink device in step 810, the encoding format of the encoded audio stream can be checked. That is, the method determines whether the encoding format of the encoded audio stream which is decoded by the source device and output through the output device of the source device, is the decodable format of the sink device. The subsequent processing on the audio stream can be explained based on the descriptions of the video stream as stated above.

The source device can further decode and output the encoded audio stream, and encode and transmit the output audio stream to the sink device, which is not depicted in the drawing.

If at step 810, it is determined that the encoded video stream format is not compatible with any decoding format at the sink device, the method proceeds to step 860. Here, the video stream is decoded and output at the source device, and the decoded video is then re-encoded in a format compatible with a decoding format of the sink device at step 870 in a conventional manner. The re-encoded video stream is then packetized and transmitted at steps 840 and 850.

The instruction sets for the respective operations of FIG. 8 can be included in the CODEC module 215 of the memory 210 of FIG. 2. In this case, the CODEC module 215 stored to the memory 210 can be executed by one or more processors.

The exemplary embodiments and various functional operations of the present invention described herein can be implemented in computer software, firmware, hardware, or in combinations of one or more of them including the structures disclosed in this specification and their structural equivalents. The exemplary embodiments of the present invention can be implemented as one or more computer program products, that is, one or more data processors, or one or more modules of computer program instructions encoded on a computer-readable medium to control the devices.

The computer-readable medium may be a machine-readable storage medium, a machine-readable storage substrate, a memory device, a material affecting a machine-readable propagated stream, or a combination of one or more of these.

The term 'data processor' encompasses every device, apparatus, and machine including, for example, a programmable processor, a computer, a multiple processors, or a computer, for processing data. The device can be added to the hardware and include program code for creating an execution environment of a corresponding computer program, for example, code for constituting processor firmware, a protocol stack, a database management system, an operating system, or a combination of one or more of these.

The propagated stream is an artificially generated stream, for example, a machine-generated electrical, optical, or electromagnetic stream which is generated to encode information for transmission to a suitable receiver. A computer program (which is also referred to as a program, software, software application, script, or code) can be written in any form of a programming language including compiled or interpreted languages, and can be deployed in any form including a stand-alone program or a module, component, subroutine, or other unit suitable for use in a computing environment. A computer program may not need to correspond to a file of a file system. A program can be stored in a portion of a file which holds other programs or data (e.g., one or more scripts stored in a markup language document), in a single file dedicated to the corresponding program, or in multiple coordinated files (e.g., one or more modules, sub-programs, or part of code).

A computer program can be deployed to be executed on one computer or on multiple computers which are located at one site or distributed across multiple sites and interconnected by a communication network. The processes and logic flows described in this specification can be performed by one or more programmable processors executing one or more computer programs to perform functions by operating on input data and generating the output. The processes and logic flows can also be performed by, and the apparatus can also be implemented as, special purpose logic circuitry, for example, a Field Programmable Gate Array (FPGA) or an Application Specific Integrated Circuit (ASIC).

Although this specification contains many specific details, these should not be construed as limitations on the scope of any inventions or of what may be claimed, but rather as descriptions of features specific to particular embodiments of particular inventions. Certain features which are described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, although operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A source device comprising:
    a wireless local area communication module;
    a memory to store instructions and an encoded video content; and
    a processor operably coupled with the wireless local area communication module and the memory, the processor configured to execute the instructions to:
        establish a wireless fidelity display (WFD) connection between the source device and a sink device using the wireless local area communication module;
        transmit, to the sink device, first information to query a video format supported by the sink device;
        receive, from the sink device, second information comprising a list including at least one video format supported by the sink device in response to the first information;
        determine, based at least in part on the second information, whether at least one portion of the encoded video content is decodable by the sink device using the at least one video format;
        transmit, based on determining that the at least one portion of the encoded video content is decodable by using the at least one video format in the sink device, the at least one portion of the encoded video content to the sink device via the WFD connection; and
        based on determining that the at least one portion of the encoded video content is not decodable by using the at least one video format in the sink device, decode the at least one portion of the encoded video content and encode the decoded at least one portion using the at least one video format to generate a re-encoded video content, and transmit the re-encoded video content to the sink device via the WFD connection,
        wherein the at least one portion of the encoded video content that is transmitted from the source device to the sink device is decoded by using the at least one video format in the sink device, and is presented via a display of the sink device,
        wherein the re-encoded video content that is transmitted from the source device to the sink device is decoded by using the at least one video format in the sink device, and is presented via the display of the sink device.

2. The source device of claim 1, wherein the first information is transmitted in a capability negotiation process, and wherein the second information is received in the capability negotiation process.

3. The source device of claim 1, wherein the first information comprises information to query a playback state of the encoded video content, wherein the second information further comprises information regarding a current playback state of the encoded video content in the sink device, and wherein the information regarding the current playback state is configured with a presentation timestamp (PTS).

4. The source device of claim 1, wherein the second information further comprises a list including at least one audio format supported by the sink device, and wherein the at least one processor is further configured to execute the instructions to transmit, to the sink device, a re-encoded audio content by using the at least one audio format.

5. The source device of claim 1, wherein the transmitted at least one portion of the encoded video content is decoded by using the at least one video format and is presented via the display of the sink device.

6. The source device of claim 1, wherein the transmitted re-encoded video content is decoded by using the at least one video format and is presented via the display of the sink device.

7. The source device of claim 1, further comprising: a display operably coupled to the processor, wherein the processor is further configured to execute the instructions to: decode the encoded video content to generate a decoded video content; and present the decoded video content via the display as synchronized with the at least one portion of the encoded video content which is decoded in the sink device and presented via the display of the sink device.

8. The source device of claim 1, wherein the processor is further configured to execute the instructions to: transmit, to another sink device distinct from the sink device, a re-encoded audio content, wherein the transmitted at least one portion of the encoded video content is presented via the display of the sink device, and wherein the transmitted re-encoded audio content is outputted via a speaker of the another sink device.

9. A sink device comprising: a wireless local area communication module; a memory to store instructions; a display; and a processor, operably coupled with the wireless local area communication module and the memory, configured to: establish a wireless fidelity display (WFD) connection between a source device and the sink device using the wireless local area communication module; receive, from the source device, first information to query a video format supported by the sink device; transmit, to the source device, second information comprising a list including at least one video format supported by the sink device in response to the first information; receive, from the source device, at least one portion of encoded video content stored in the source device or a re-encoded video content which is decodable by the at least one video format, wherein the at least one portion of the encoded video content is received in response to determining, by the source device, that the at least one portion of the encoded video content is decodable by using the at least one video format in the sink device, wherein the re-encoded video content is received in response to determining, by the source device, that the at least one portion of the encoded video content is not decodable by using the at least one video format in the sink device; if receiving the at least one portion of the encoded video content, decode the at least one portion of the encoded video content by using the at least one video format and present the decoded at least one portion of the encoded video content via the display; and if receiving the re-encoded video content, decode the re-encoded video content by using the at least one video format and present the re-encoded video content which is decoded via the display.

10. The sink device of claim 9, wherein the first information is received in a capability negotiation process, and wherein the second information is transmitted in the capability negotiation process.

11. The sink device of claim 9, wherein the first information comprises information to query a playback state of the encoded video content, and wherein the second information further comprises information regarding a current playback state of the encoded video content in the sink device, and wherein the information regarding the current playback state is configured with a presentation timestamp (PTS).

12. The sink device of claim 9, further comprising: a speaker, wherein the second information further comprises a list including at least one audio format supported by the sink device, and wherein the processor is further configured to execute the instructions to: receive, from the source device, a re-encoded audio content by using the at least one audio format; generate an output signal by decoding the re-encoded audio content; and output, via the speaker, the output signal.

13. The sink device of claim 9, wherein the processor is configured to execute the stored instructions to: present, via the display, the decoded at least one portion of the encoded video content as synchronized with the at least one portion of the encoded video content which is decoded in the source device and is presented via a display of the source device.

14. The sink device of claim 9, wherein a re-encoded audio content is transmitted from the source device to another sink device distinct from the sink device, and wherein the transmitted re-encoded audio content is outputted via a speaker of the another sink device.

* * * * *